Figure 1:
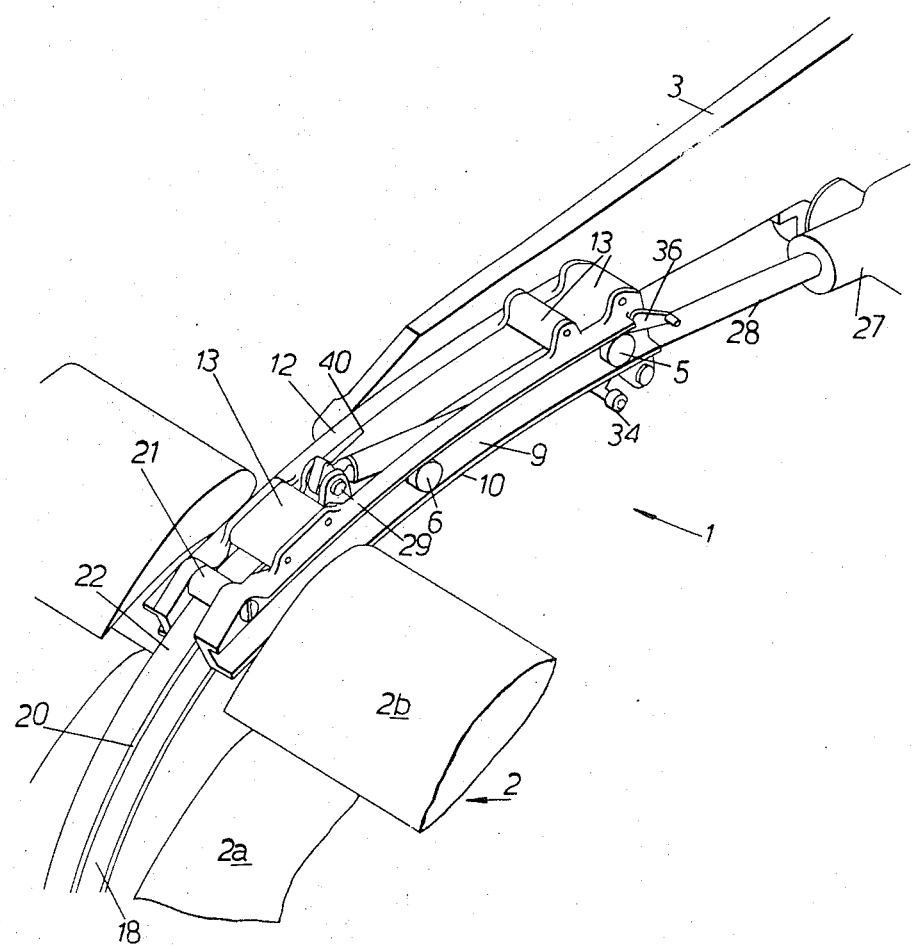

United States Patent [19]
Lee

[11] 3,785,594
[45] Jan. 15, 1974

[54] AIRCRAFT FLAP SYSTEM
[75] Inventor: Norman Lee, St. Annes-on-Sea, England
[73] Assignee: British Aircraft Corporation Limited, London, England
[22] Filed: Mar. 10, 1972
[21] Appl. No.: 233,505

[30] Foreign Application Priority Data
Mar. 12, 1971 Great Britain............... 8,236/71

[52] U.S. Cl............................................. 244/42 DA
[51] Int. Cl................................................ B64c 3/54
[58] Field of Search................... 244/42 D, 42 DA, 244/42 DB, 42 DC, 42 CB, 40, 41, 43, 44

[56] References Cited
UNITED STATES PATENTS
2,405,726   8/1946   Zap.................................. 244/42 D
3,528,632   9/1970   Miles et al. ..................... 244/42 DA
2,938,680   5/1960   Greene et al. ......................... 244/42

FOREIGN PATENTS OR APPLICATIONS
802,742   9/1936   France............................ 244/42 DB

*Primary Examiner*—Trygve M. Blix
*Assistant Examiner*—Charles E. Frankfort
*Attorney*—Cushman, Darby & Cushman

[57] ABSTRACT

In an aircraft, a lift-increasing flap system includes a flap carried on units which each comprise two guide members which are telescopic with one another, there being provided means such that on initial extension of the flap, the guides are coupled together and extend as one, but on further extension the guides are uncoupled such that one guide can extend from the other.

6 Claims, 7 Drawing Figures

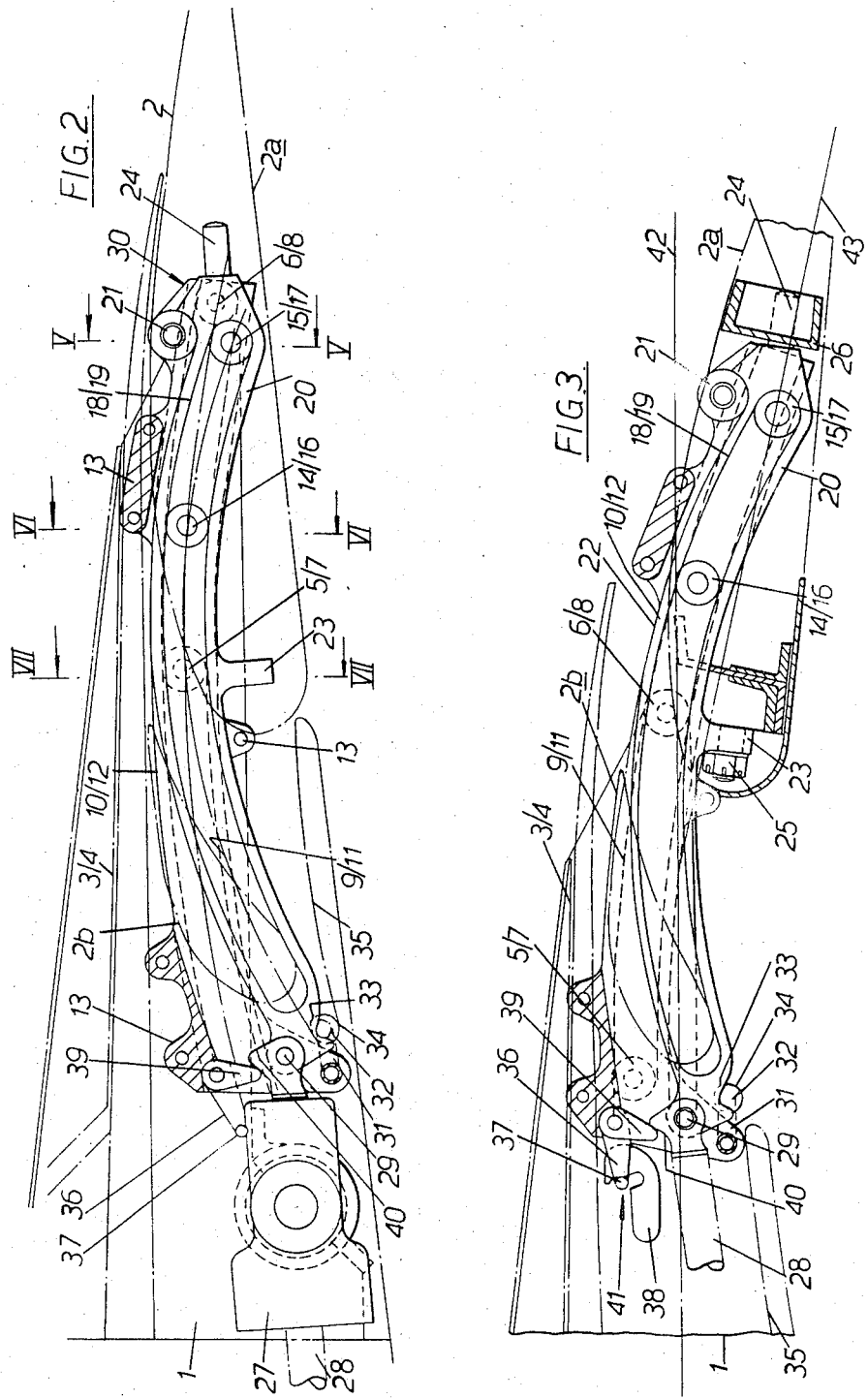

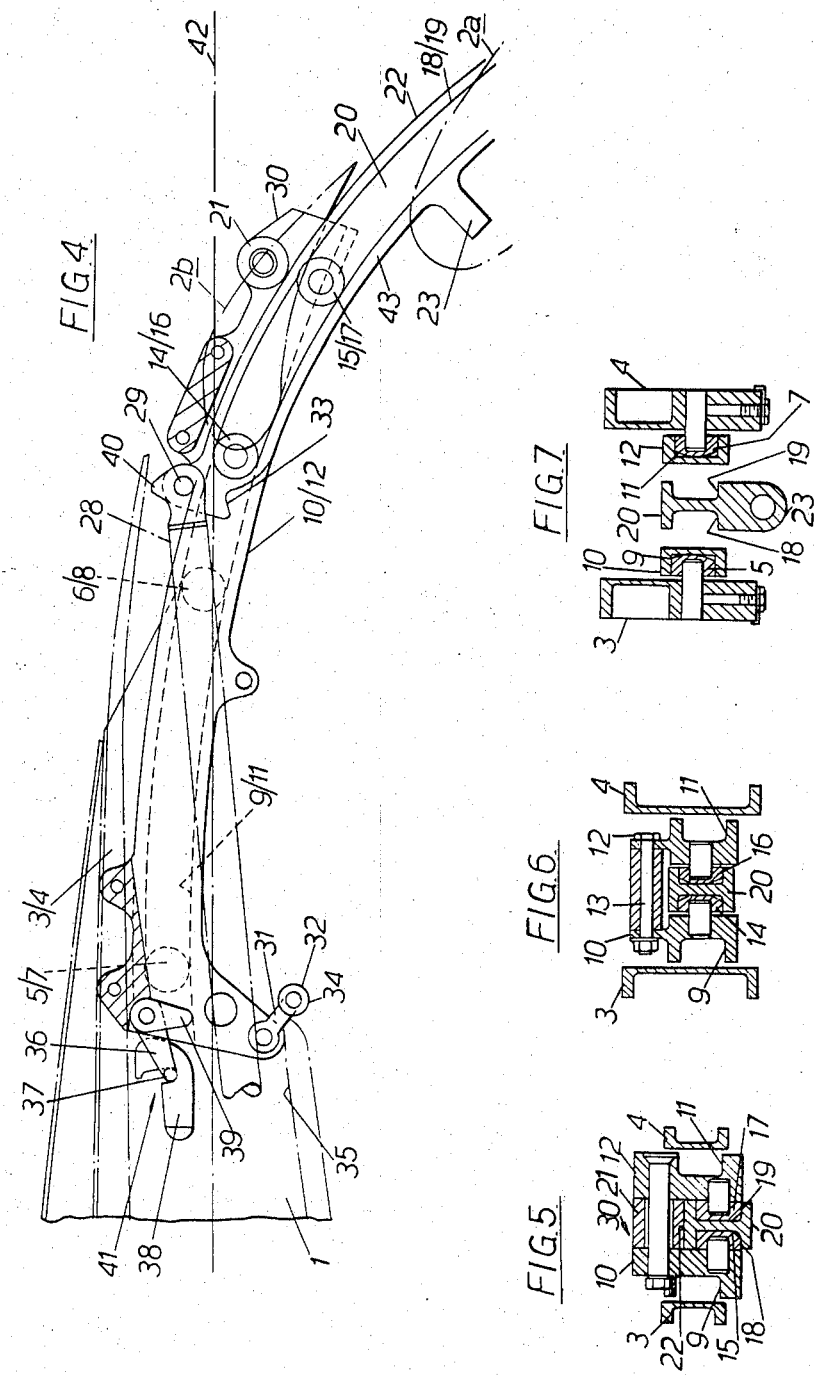

AIRCRAFT FLAP SYSTEM

This invention relates to lift-increasing flap systems for aircraft.

According to the present invention, a lift-increasing flap system includes, in combination with an aircraft wing, a flap, an actuator device for extending and retracting the flap from and toward the aircraft wing, a first guide unit and means mounting the first guide unit for extension and retraction movement with respect to the wing, a second guide unit, and means mounting the second guide unit for extension and retraction on the first guide unit, the second guide unit carrying the lift-increasing flap, the guide units having releasable coupling means whereby on initial extension of the actuator the two guide units are coupled together and move as one, but on further extension of the actuator the guide units can be extended from the first guide unit.

Preferably the releasable coupling means includes a latch arm pivotably mounted on one of said guide units and a hook on the other of said guide units, the aircraft wing having a cam surface positioned to cause engagement of the hook by the latch arm during initial extension of the actuator.

Preferably restraining means are provided to prevent the first guide unit from further extension movement with respect to the wing on release of the releasable coupling means. The restraining means may be a further hook member mounted on the wing engageable by a further latch arm on the first guide unit.

A preferred embodiment of the invention is illustrated and described with reference to the accompanying drawings.

In these drawings:

FIG. 1 is a perspective view of a flap system with the flap extended,

FIG. 2 is a side elevation of the flap system in a fully retracted position; the wing and flap outlines are indicated in broken outline for clarity, FIG. 3 is a side elevation similar to that of FIG. 2 but with the system in a partly extended position, FIG. 4 is a side elevation similar to those of FIGS. 2 and 3 but with the system in a fully extended position, FIG. 5 is a section on line V—V of FIG. 2, FIG. 6 is a section on line VI—VI of FIG. 2, and, FIG. 7 is a section on line VII—VII of FIG. 2.

An aircraft has a wing 1 fitted with a lift-increasing flap 2 which is extendable from and retractable into the trailing edge region of the wing. In the fully retracted position (shown in FIG. 2) the flap 2 conforms with the contour of the aerofoil section of the wing. The flap 2 is of the slotted type having a main flap member 2a spaced from the leading edge of which is a vane 2b.

The flap is actuated by a plurality of actuating mechanisms spaced span-wise along the flap. Since these are substantially identical only one example is illustrated.

Each mechanism is located between a pair of chordwise rearwardly extending wing structural members 3 and 4. Only that referenced 3 is shown in FIG. 1 for clarity. Both members 3 and 4 lie within the wing contour.

On their inwardly directed faces, the members 3 and 4 have pairs of rollers 5,6 and 7,8 respectively. The pair of rollers 5,6, engage an outwardly facing channel-shaped track 9 formed in a guide or track member 10. Similarly the pair of rollers 7,8, engage an outwardly facing channel-shaped track 11 formed in a guide or track member 12. The tracks 9 and 11 are of arcuate form. The track members 10 and 12 are themselves spaced apart, but are clamped one to the other to form a single unit 30 (the first guide unit) by a series of bolts and spacers. These are indicated by the reference numeral 13 in their various positions.

The track members 10 and 12 each have on their inner faces a pair of rollers 14, 15 and 16, 17, respectively. These pairs of rollers 14, 15 and 16, 17 respectively engage in outwardly facing channel-shaped arcuate tracks 18 and 19 formed on an arcuate track member 20 (the second guide unit) which lies in between the track members 10 and 12. The track members 10 and 12 have a further roller 21 which is mounted on a spigot extending between the tracks and cooperates with an upper face 22 of the track member 20.

The flap 2, comprising the main member 2a and the vane 2b, is carried by the track memer 20. To achieve this, the track member 20 has a downwardly extending lug 23 and rearwardly extending spigot 24, the lug 23 being engaged by a spigot 25 toward the leading edge of the flap member 2a and the spigot 24 engaging a rear spar 26 of the flap member 2a.

The mechanism is actuated by a screw jack, the nut 27 of which is mounted in the wing 1 and the screw 28 of which extends generally chordwise of the wing. This screw 28 is pivoted to the track member 20 at 29.

The track members 10 and 12 (that is to say the unit 30) are releasably coupled to the track member 20 by means of a latch arm 31 pivoted to the unit 30, the free end 32 of the latch arm 31 being engagable with a hook 33 formed in that end of the track member 20 remote from the flap 2. The free end 32 of the latch arm 31 is further provided with a roller follower 34 which in the retracted and part-retracted positions of the mechanism is caused to engage a cam track 35 formed on the wing structure. Such engagement causes the free end 31 of the latch to engage the hook 33.

The unit 30 has, adjacent the latch arm 31, a further latching device. This comprises a pivotable latch arm 36 whose free end 37 is adapted to engage with a hook 38 mounted on the wing structure. The latch arm 36 has a crank member 39 which is contacted in certain conditions by a cam formation 40 on that end of the screw 28 anchored to the track unit 30. The hook 38 is slotted at 41 so that the free end 37 of the latch arm 36 can lie in the base of the slot and is then, together with the track unit 30, prevented from moving in either chordwise direction i.e. neither forwards or rearwards. This is shown in FIG. 3. Contact with the crank member 39 by the cam formation 40 urges the latch arm 36 into a further position in which the trackunit 30 can move only forwards i.e. into a retracted position.

The operation of the flap extension mechanism described is as follows: assuming the flap 2 and its actuating mechanism to be fully retracted into the position indicated in FIG. 2, the flap 2 is extended by rearward movement of the screw 28. In this condition, the roller follower 34 is in engagement with the cam track 35 so that the latch arm 31 engages the hook 33 and locks the track unit 30 (i.e. track members 10 and 12) to the track member 20. The assembly of items 30 and 20 thus moves bodily rearward on rollers 5,6 and 7, 8 and tracks 9 and 11.

The cam formation 40 on the screw 28 is in contact with the crank 39 during this initial movement so that the latch arm 26 is maintained in such a position as to eventually engage the hook slot 41.

Extension of the screw 28 and rearward movement of the locked units 20 and 30 continues until the position of FIG. 3 is reached. In this position the flap 2 is in a position of 12° droop, the 12° being measured between the wing chord line shown at 42 and the flap chord line shown at 43 (FIG. 3). Also in this position the roller follower 34 has just become disengaged from the cam track 35 thereby allowing the free end 32 to drop away from the hook 33 so that further extension of the screw 28 will separate the unit 30 and the track member 20.

The latch arm 36 has also engaged the hook 38 so that during the further extension of the screw 28 the unit 30 is in effect anchored to the wing. Thus the track member 20 is extended from the unit 30 on rollers 13, 15 and 16, 17 and track 18, 19 and also as constrained by roller 21 engaging with surface 22.

Further extension of the screw 28 moves the track member 20 and hence the flap 2 to the fully extended position of FIG. 4. In this position the flap has a droop of 50°, again measured between the wing chord line 42 and the flap chord line 43. The cam formation 40 has now moved away from the crank member 29 and so the latching arm 36 has engaged the base of the hook slot 41. This feature ensures that on retraction of the flap, the unit 30 stays in the position of FIGS. 3 and 2 whilst the track member 20 is retracted into it.

Retraction of the flap is essentially in the opposite sequence to that described, namely, the track member 20 is drawn initially by the retracting screw 28 into the stationary unit 30 to the position of FIG. 3.

The cam formation 40 then engages the crank member 39 and moves the latch arm 36 to a position in which it can be freed from the hook 38 by forward movement of the unit 30. Such forward movement is caused by the engagement of the rollers 15, 17 with abutments at the ends of their tracks on track member 20.

The roller follower 34 engages the cam track 35 as the unit 30 is retracted and thereby causes the engagement of the latch arm 31 with the hook 33 in readiness for a further flap extension movement.

By the arrangement described, it is possible to house the flap actuating mechanism entirely within the wing contour when retracted This is particularly important on variable sweep-back winged aircraft where any housings external to the wing surface to cover any protruding mechanism require to present a minimum drag producing shape to the airstream at varying positions of wing sweep. Such a shape is difficult to provide.

I claim:

1. A lift-increasing flap system for aircraft which is arranged to be movable from a fully retracted position to a position of intermediate extension and subsequently to a fully extended position including in combination with an aircraft wing, a flap, an actuator device for extending and retracting the flap from and toward the wing, a first guide unit and means mounting the first guide unit for extension and retraction movement with respect to the wing, a second guide unit, and means mounting the first guide unit for extension and retraction movement on the first guide unit, the second guide unit carrying the flap, the guide units having releasable coupling means whereby on initial extension of the actuator the two guide units are coupled together and move as one until the said position of intermediate extension is reached, but, on further extension of the actuator, they are uncoupled so that the second guide unit can be extended from the first guide unit to reach the said fully extended position.

2. A lift-increasing flap system according to claim 1 wherein the means mounting the first guide unit for movement with respect to the wing includes arcuate tracks engaged by rollers.

3. A lift-increasing flap system according to claim 1 wherein the means for mounting the second guide unit on the first guide unit also includes arcuate tracks engaged by rollers.

4. A lift-increasing flap system according to claim 1 wherein the releasable coupling means includes a latch arm pivotably mounted on one of the said guide units and a hook on the other of the said guide units, there being provided a cam surface on the wing positioned to cause engagement of the hook by the latch arm during initial extension of the actuator.

5. A lift-increasing flap system according to claim 1 wherein restraining means are provided to prevent the first guide unit from further extension movement with respect to the wing on release of the releasable coupling means.

6. A lift-increasing flap system according to claim 5 in which the restraining means comprises a further hook member mounted on the wing engageable by a further latch arm on the first guide unit.

* * * * *